United States Patent
Miyamoto et al.

(10) Patent No.: US 7,868,749 B2
(45) Date of Patent: Jan. 11, 2011

(54) METHOD AND APPARATUS FOR DETECTING DECREASE IN TIRE AIR PRESSURE AND PROGRAM FOR DETERMINING DECREASE IN TIRE AIR PRESSURE

(75) Inventors: Kazuyoshi Miyamoto, Hyogo (JP); Minao Yanase, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 5 days.

(21) Appl. No.: 12/408,089

(22) Filed: Mar. 20, 2009

(65) Prior Publication Data

US 2009/0256696 A1    Oct. 15, 2009

(30) Foreign Application Priority Data

Mar. 21, 2008  (JP)  ............... 2008-073418

(51) Int. Cl.
*B60C 23/00* (2006.01)
(52) U.S. Cl. .................. 340/444; 340/426.33; 340/429; 340/441; 340/442; 340/447; 73/146.2; 701/69; 701/70
(58) Field of Classification Search .......... 340/444, 340/426.33, 429, 440, 441, 442, 443, 447; 73/146, 146.2, 146.3; 701/69, 70, 79
See application file for complete search history.

(56) References Cited

U.S. PATENT DOCUMENTS

| | | | | | |
|---|---|---|---|---|---|
| 5,170,343 | A | * | 12/1992 | Matsuda | ............... 700/79 |
| 6,904,349 | B2 | * | 6/2005 | Mori | ............... 701/70 |
| 7,613,558 | B2 | * | 11/2009 | Yoneda | ............... 701/67 |
| 2009/0118906 | A1 | * | 5/2009 | Tanaka | ............... 701/41 |
| 2009/0227421 | A1 | * | 9/2009 | Saito | ............... 477/175 |

FOREIGN PATENT DOCUMENTS

| | | |
|---|---|---|
| EP | 0554131 A1 | 8/1993 |
| EP | 0783983 A1 | 7/1997 |
| EP | 1433627 A2 | 6/2004 |
| EP | 1640189 A2 | 3/2006 |
| JP | 63-305011 A | 12/1988 |
| JP | 2005-053263 A | 3/2005 |
| WO | WO-02/068226 A1 | 9/2002 |

\* cited by examiner

*Primary Examiner*—Davetta W Goins
(74) *Attorney, Agent, or Firm*—Birch, Stewart, Kolasch & Birch, LLP (57) ABSTRACT

The method includes: a step of calculating wheel rotation information; a judgment step of judging a decrease in a tire air pressure by comparing a predetermined reference value with a decreased pressure judgment value showing a wheel speed ratio of the front and rear axes; an initialization step of storing the wheel speed ratio between the front and rear axes at the regular internal pressure; and a step of determining whether the distribution of the front and rear driving torque is equidistribution or not.

5 Claims, 9 Drawing Sheets

METHOD AND APPARATUS FOR DETECTING DECREASE IN TIRE AIR PRESSURE AND PROGRAM FOR DETERMINING DECREASE IN TIRE AIR PRESSURE

BACKGROUND OF THE INVENTION

1. Field of the Invention

The present invention relates to a method and an apparatus for detecting a decrease in a tire air pressure and a program for determining a decrease in a tire air pressure.

2. Description of the Related Art

Conventionally, an apparatus for detecting a decrease in a tire air pressure uses a principle according to which a tire having a decreased pressure shows a reduced outer diameter (tire dynamic loaded radius) compared to that of tires having a normal air pressure and thus shows an increased angular velocity (wheel speed) compared to that of other normal tires. In the case of a method of detecting a decrease in an air pressure based on a relative difference in a tire wheel speed for example, a judgment value DEL obtained by DEL=$\{(V1+V4)/2-(V2+V3)/2\}/\{(V1+V2+V3+V4)/4\} \times 100(\%)$ is used. When an absolute value of this DEL exceeds an alarming threshold value, an alarm is raised (see Japanese Unexamined Patent Publication No. 305011/1988 for example). The reference numerals V1 to V4 represent the wheel speeds of a left front wheel tire, a right front wheel tire, a left rear wheel tire, and a right rear wheel tire, respectively.

When the judgment value DEL as described above is used to judge a decreased pressure of a tire, a tire slip rate caused during driving changes due to an unbalanced load for example. In this case, the DEL, which is calculated based on a relative difference in the wheel speed, cannot exclude the influence by the slip rate, consequently causing a wrong judgment of a decreased pressure in spite of a normal pressure.

To solve this, a method of detecting a decrease in a tire air pressure has been proposed according to which three judgment values DEL1, DEL2, and DEL3 can be used to raise a decreased pressure alarm and to identify a position of a wheel having a decreased pressure while avoiding a false judgment (see Japanese Unexamined Patent Publication No. 2005-53263). The judgment value DEL1 is obtained by dividing, by a predetermined average wheel speed, a difference of the sum of the wheel rotation information between two pairs of wheel tires on diagonal lines. The judgment value DEL2 is obtained by dividing, by a predetermined average wheel speed, a difference between a sum of the wheel rotation information for front wheel tires and a sum of the wheel rotation information for rear wheel tires. The judgment value DEL3 is obtained by dividing, by a predetermined average wheel speed, a difference between a sum of the wheel rotation information for right wheel tires and a sum of the wheel rotation information for left wheel tires.

Among the three judgment values, the judgment value DEL2 is generally considered to be changeable depending on driving torque or a vehicle velocity. In order to judge whether a tire has a decreased pressure or not, it is required to perform initialization when a regular internal pressure is maintained to calculate an initial value of the judgment value DEL2 at the regular internal pressure. When the initial value of DEL2 is learned as a factor depending on driving torque for example, changes of DEL2 depending on the driving torque changing momentarily are stored and DEL2 is represented as a function of the driving torque to calculate an approximate expression showing the correlation between the DEL2 and the driving torque. In the case of a two-wheel driving vehicle, the relation between the former and the later as shown in FIG. 5 for example where the horizontal axis represents a driving torque and the vertical axis represents DEL2.

Figure 5:
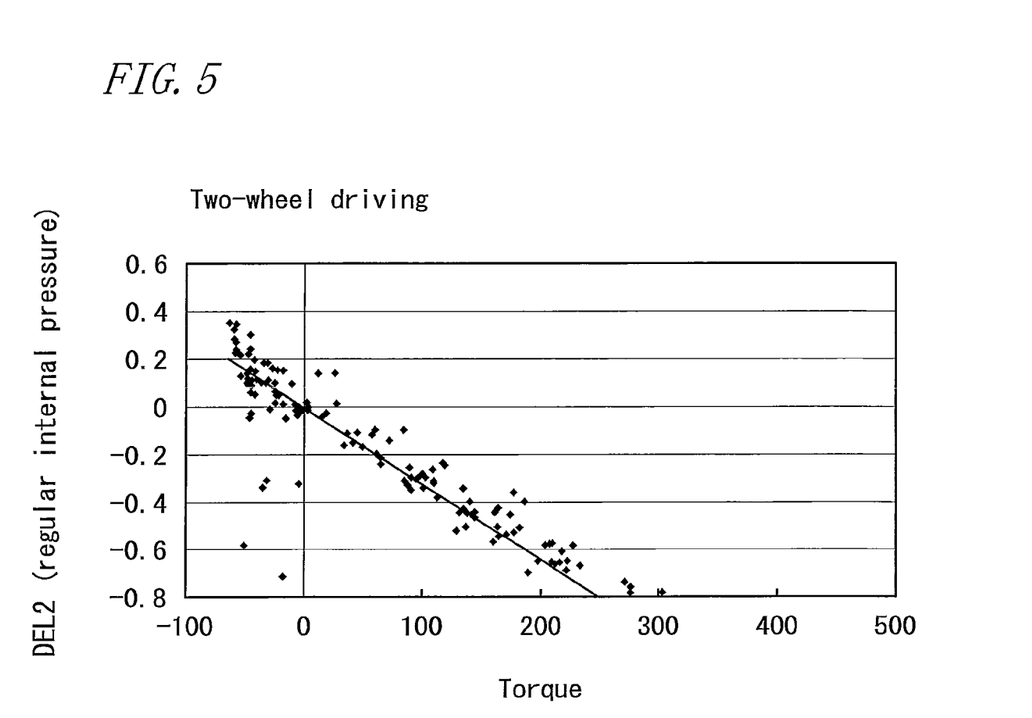
FIG. 5 illustrates the relation between DEL2 and the driving torque in a two-wheel driving vehicle.
Figure 6:
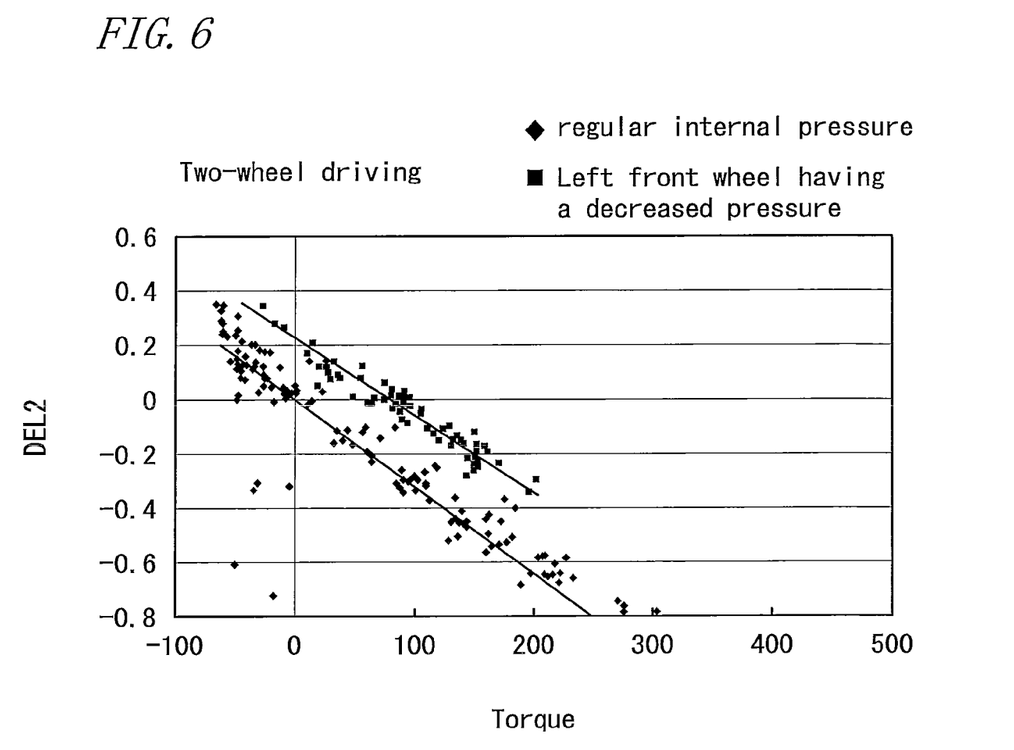
FIG. 6 illustrates the relation between DEL2 and the driving torque at a regular internal pressure and a decreased pressure.

As shown in FIG. 5, the relation between the driving torque and DEL2 can be approximated by a linear function. Thus, A and B satisfying DEL2=A×driving torque+B are calculated during initialization. Based on this, an index for distinguishing a decreased pressure status from a regular internal pressure status is obtained. FIG. 6 illustrates the relation between the driving torque and DEL2 in the regular internal pressure status and the relation between the driving torque and DEL2 in the decreased pressure status. Assuming that a driving torque at a certain time t is T(t) for example, DEL2 at a regular internal pressure when the driving torque is T(t) is DEL2=A×T(t)+B. DEL2 at this time t can be calculated based on the wheel rotation information obtained from the respective wheel tires. By comparing this calculated DEL2 with DEL2 at the regular internal pressure, whether there is a tire having a decreased pressure or not can be determined.

Figure 7:
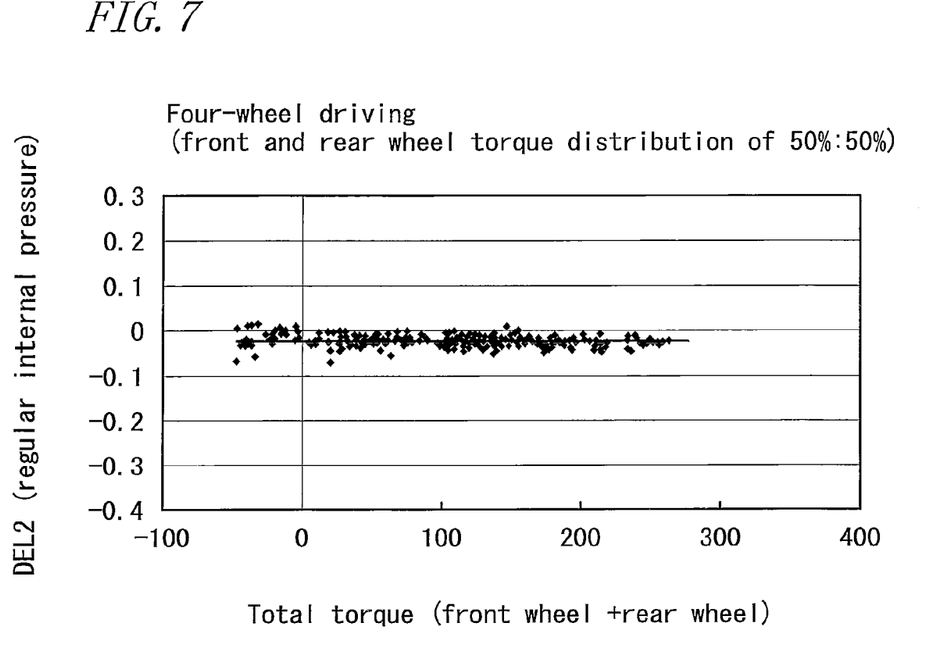
FIG. 7 illustrates the relation between DEL2 and the total of the front and rear driving torque in a four-wheel driving vehicle.
Figure 8:
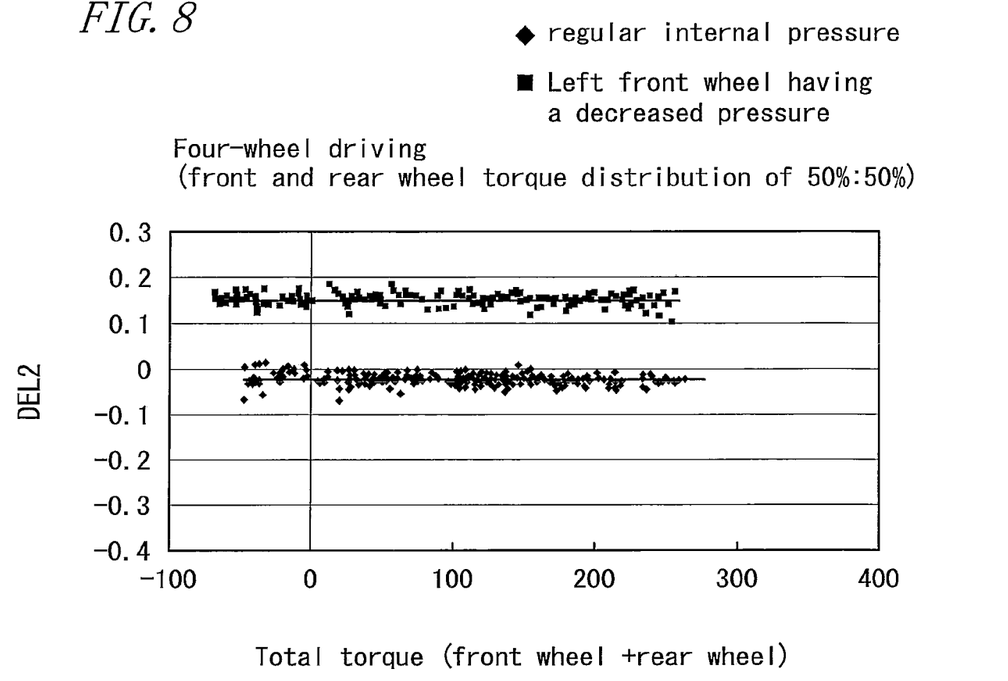
FIG. 8 illustrates the relation between DEL2 and the total of the front and rear driving torque at a regular internal pressure and a decreased pressure.

In the case of a four-wheel driving vehicle, when driving torque is evenly distributed to the front and rear axes to establish equidistribution (50%:50%), DEL2 also has a substantially-constant value regardless of the magnitude of the driving torque as shown in FIG. 7 for example. Thus, this DEL 2 can be used as a reference value. By comparing this reference value with DEL2 calculated during the vehicle running, whether there is a tire having a decreased pressure or not can be determined. FIG. 8 illustrates a difference between DEL2 when a regular internal pressure is maintained and DEL2 when a decreased pressure is caused.

Figure 9:
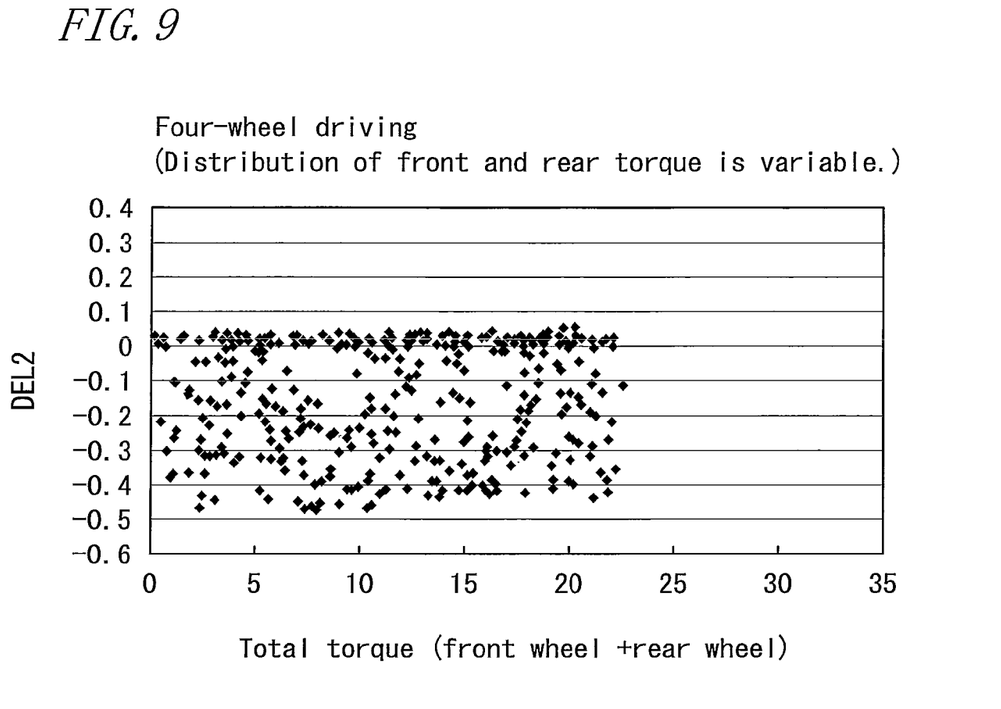
FIG. 9 illustrates the relation between DEL2 and the total of the front and rear driving torque in a four-wheel driving vehicle for which the distribution of the front and rear driving to is variable.

However, DEL2 depends on a driving torque or a vehicle velocity only in the case of a two-wheel driving vehicle. In the case of a four-wheel driving vehicle, DEL2 converges to a constant value only when the distribution of the front and rear driving torque is even to establish equidistribution (50%:50%). When the distribution of the front and rear driving torque of a four-wheel driving vehicle is variable, DEL2 does not converge to a constant value as shown in FIG. 9 and its correlation with the sum of the front and rear driving torque cannot always be found.

In the case of a vehicle that does not have equidistribution of the front and rear driving torque, DEL2 does not have a fixed relation to the sum (total value) of the front and rear driving torque. Thus, it is difficult to use this value of DEL2 to accurately distinguish a decreased pressure status from a regular internal pressure status.

SUMMARY OF THE INVENTION

The present invention has been made in view of the situation as described above. It is an objective of the present invention to provide a method and an apparatus for detecting a decrease in a tire air pressure by which a tire having a decreased pressure can be accurately detected in a four-wheel vehicle for which the distribution of the front and rear driving torque is variable, and a program for determining a decrease in a tire air pressure.

In accordance with the present invention, there is provided a method of detecting a decrease in a tire air pressure based on wheel rotation information obtained from tires attached to a four-wheel vehicle for which a distribution of the front and rear driving torque is variable, including:

a step of calculating wheel rotation information obtained from the respective wheel tires;

a judgment step of judging a decrease in a tire air pressure by comparing a predetermined reference value with a decreased pressure judgment value that is calculated based on the wheel rotation information and that shows a wheel speed ratio between the front and rear axes;

an initialization step of storing a wheel speed ratio between the front and rear axes at a regular internal pressure in order to obtain the predetermined reference value; and a step of determining whether a distribution of front and rear driving torque is equidistribution or not, wherein the initialization step includes a step of obtaining, when the distribution of the front and rear driving torque is determined to be equidistribution, a first relation formula showing a correlation between the total of the driving torque and the decreased pressure judgment value and a step of, when the distribution of the front and rear driving torque is determined not to be equidistribution, obtaining a second relation formula showing the correlation between a difference in the driving torque and the decreased pressure judgment value, and wherein the judgment step judges a decrease in a tire air pressure by comparing, when the distribution of the front and rear driving torque is determined to be equidistribution, a reference value obtained based on the first relation formula with the decreased pressure judgment value and by comparing, when the distribution of the front and rear driving torque is determined not to be equidistribution, the reference value obtained based on the second relation formula with the decreased pressure judgment value.

The method of detecting a decrease in a tire air pressure of the present invention focuses on the following point. In a vehicle for which the distribution of the front and rear driving torque is variable, DEL2 (a decreased pressure judgment value showing a wheel speed ratio between the front and rear axes) depends not on the total value of the driving torque but on a difference between the front and rear driving torque. Thus, in the initialization step there is obtained the second relation formula showing the correlation between a difference in the driving torque and the decrease judgment value. Then, during the vehicle running, whether the distribution of the front and rear driving torque is equidistribution or not is determined. When the distribution of the front and rear driving torque is determined not to be equidistribution, the reference value obtained based on the second relation formula is compared with the decreased pressure judgment value to judge a decrease in a tire air pressure. When the distribution of the front and rear driving torque is determined to be equidistribution on the other hand, a reference value obtained based on the first relation formula showing the correlation between the total of the driving torque calculated in the initialization step with the decreased pressure judgment value is compared with the decreased pressure judgment value to judge a decrease in a tire air pressure. In this manner, in both of the case where the distribution of the front and rear driving torque is equidistribution and the case where the distribution of the front and rear driving torque is not equidistribution, DEL2 can be momentarily monitored to accurately determine whether a regular internal pressure is maintained or not.

The judgment step can include: a step of computing a decreased pressure judgment value obtained by dividing a difference in the sum of wheel rotation information between two pairs of wheel tires on diagonal lines by a predetermined average wheel speed and a decreased pressure judgment value obtained by dividing a difference between a sum of wheel rotation information of right wheel tires and a sum of wheel rotation information of left wheel tires by a predetermined average wheel speed, respectively; a step of storing these decreased pressure judgment values and the decreased pressure judgment value showing a wheel speed ratio between the front and rear axes; and a step of judging, based on judgment conditions for the respective three decreased pressure judgment values set for the respective wheel tires, a decrease in the air pressures of the respective wheel tires. In this case, in addition to DEL2, a decreased pressure judgment value (DEL1) obtained by dividing a difference in the sum of wheel rotation information between two pairs of wheel tires on diagonal lines by a predetermined average wheel speed and a decreased pressure judgment value (DEL3) obtained by dividing a difference between a sum of wheel rotation information of right wheel tires and a sum of wheel rotation information of left wheel tires by a predetermined average wheel speed are calculated. Based on judgment conditions for the respective three decreased pressure judgment values, a decrease in the air pressures of the respective wheel tires can be judged to identify a tire having a decreased pressure.

In accordance with the present invention, there if further provided an apparatus for detecting a decrease in a tire air pressure based on wheel rotation information obtained from tires attached to a four-wheel vehicle for which a distribution of the front and rear driving torque is variable, comprising:

a rotation information detection means for calculating wheel rotation information obtained from the respective wheel tires;

a judgment means for judging a decrease in a tire air pressure by comparing a predetermined reference value with a decreased pressure judgment value that is calculated based on the wheel rotation information and that shows a wheel speed ratio between the front and rear axes;

an initialization means for storing a wheel speed ratio between the front and rear axes at a regular internal pressure in order to obtain the predetermined reference value; and a torque distribution determining means for determining whether a distribution of front and rear driving torque is equidistribution or not, wherein the initialization means includes a computation means for obtaining, when the distribution of the front and rear driving torque is determined to be equidistribution, a first relation formula showing a correlation between the total of the driving torque and the decreased pressure judgment value and a computation means for obtaining, when the distribution of the front and rear driving torque is determined not to be equidistribution, a second relation formula showing the correlation between a difference in the driving torque and the decreased pressure judgment value, and wherein the judgment means judges a decrease in a tire air pressure by comparing, when the distribution of the front and rear driving torque is determined to be equidistribution, a reference value obtained based on the first relation formula with the decreased pressure judgment value and by comparing, when the distribution of the front and rear driving torque is determined not to be equidistribution, the reference value obtained based on the second relation formula with the decreased pressure judgment value.

The apparatus for detecting a decrease in a tire air pressure of the present invention focuses on the following point. In a vehicle for which the distribution of the front and rear driving torque is variable, DEL2 (a decreased pressure judgment value showing a wheel speed ratio between the front and rear axes) depends not on the total values of the driving torque but on a difference between the front and rear driving torque. Thus, the initialization means obtains the second relation formula showing the correlation between a difference in the driving torque and the decreased pressure judgment value. During the vehicle running, whether the distribution of the front and rear driving torque is equidistribution or not is determined. When the distribution of the front and rear driving torque is determined not to be equidistribution, the reference value obtained based on the second relation formula is compared with the decreased pressure judgment value to judge a decrease in a tire air pressure. When the distribution of the front and rear driving torque is determined to be equidistribution on the other hand, a reference value obtained based on the first relation formula showing the correlation between the total of the driving torque calculated by the initialization means and the decreased pressure judgment value is compared with the decreased pressure judgment value to judge a decrease in a tire air pressure. In this manner, in both of the case where the distribution of the front and rear driving torque is equidistribution and the case where the distribution of the front and rear driving torque is not equidistribution, DEL2 can be momentarily monitored to accurately determine whether a regular internal pressure is maintained or not.

The judgment means can includes: a computation means for computing a decreased pressure judgment value obtained by dividing a difference in the sum of wheel rotation information between two pairs of wheel tires on diagonal lines by a predetermined average wheel speed and a decreased pressure judgment value obtained by dividing a difference between a sum of wheel rotation information of right wheel tires and a sum of wheel rotation information of left wheel tires by a predetermined average wheel speed, respectively; a storage means for storing these decreased pressure judgment values and the decreased pressure judgment value showing a wheel speed ratio between the front and rear axes; and a means for judging, based on judgment conditions for the respective three decreased pressure judgment values set for the respective wheel tires, a decrease in the air pressures of the respective wheel tires. In this case, in addition to DEL2, a decreased pressure judgment value (DEL1) obtained by dividing a difference in the sum of wheel rotation information between two pairs of wheel tires on diagonal lines by a predetermined average wheel speed and a decreased pressure judgment value (DEL3) obtained by dividing a difference between a sum of wheel rotation information of right wheel tires and a sum of wheel rotation information of left wheel tires by a predetermined average wheel speed are calculated. Based on judgment conditions for the respective three decreased pressure judgment values, a decrease in the pneumatic pressures of the respective wheel tires can be judged to identify a tire having a decreased pressure.

In accordance with the present invention, there is yet further provided a program for causing, in order to detect a decrease in a tire air pressure based on wheel rotation information obtained from tires attached to a four-wheel vehicle for which a distribution of the front and rear driving torque is variable, a computer to function as: a judgment means for judging a decrease in a tire air pressure by comparing a predetermined reference value with a decreased pressure judgment value that is calculated based on wheel rotation information obtained from the respective tires and that shows a wheel speed ratio between the front and rear axes; an initialization means for storing a wheel speed ratio between the front and rear axes at a regular internal pressure in order to obtain the predetermined reference value; and a torque distribution determination means for determining whether a distribution of front and rear driving torque is equidistribution or not, wherein the initialization means includes a computation means for obtaining, when the distribution of the front and rear driving torque is determined to be equidistribution, a first relation formula showing a correlation between the total of the driving torque and the decreased pressure judgment value and a computation means for obtaining, when the distribution of the front and rear driving torque is determined not to be equidistribution, a second relation formula showing the correlation between a difference in the driving torque and the decreased pressure judgment value, and wherein the judgment means judges a decrease in a tire air pressure by comparing, when the distribution of the front and rear driving torque is determined to be equidistribution, a reference value obtained based on the first relation formula with the decreased pressure judgment value and by comparing, when the distribution of the front and rear driving torque is determined not to be equidistribution, the reference value obtained based on the second relation formula with the decreased pressure judgment value.

DETAILED DESCRIPTION

Hereinafter, with reference to the attached drawings, an embodiment of a method and an apparatus for detecting a decrease in a tire air pressure and a program for determining a decrease in a tire air pressure of the present invention will be described in detail.

Figure 1:
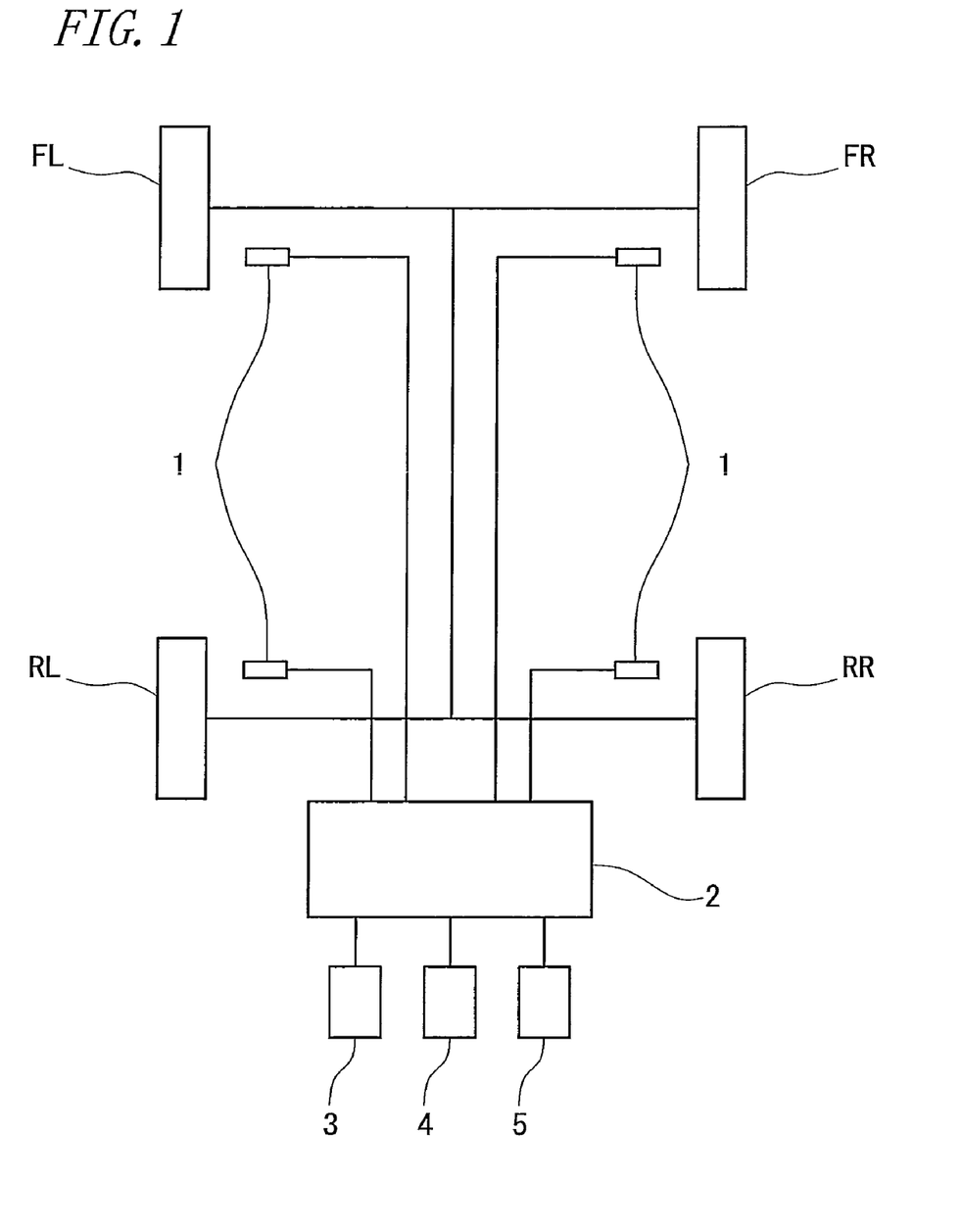
FIG. 1 is a block diagram illustrating one embodiment of an apparatus for detecting a decrease in a tire air pressure of the present invention.

As shown in FIG. 1, the apparatus for detecting a decrease in a tire air pressure according to one embodiment of the present invention includes, in order to detect wheel rotation information regarding four tires provided in a four-wheel vehicle (FL (left front wheel), FR (right front wheel), RL (left rear wheel), and RR (right rear wheel)), a normal wheel speed detection means (wheel rotation information detection means) 1 provided in association with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as the one that generates power using rotation as in a dynamo to measure an angular velocity and a wheel speed based on this voltage. The output from the wheel speed detection means 1 is given to a control unit 2 that is a computer such as ABS. This control unit 2 is connected to a display unit 3 composed of a liquid crystal display element, a plasma display element or CRT for example for displaying a tire having a decreased internal pressure, an initialization button 4 that can be operated by a driver, and an alarming unit 5 for notifying a driver of a tire having a decreased internal pressure.

Figure 2:
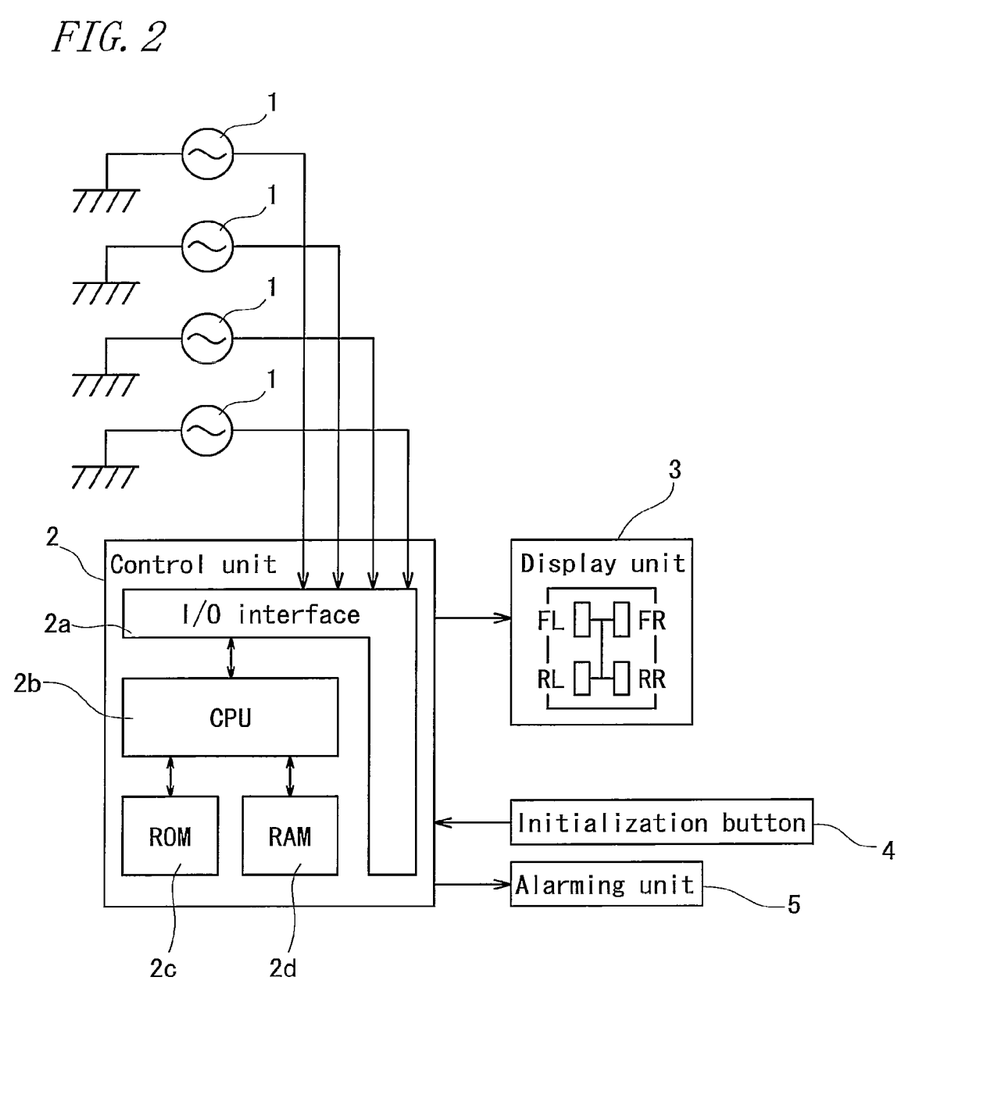
FIG. 2 is a block diagram illustrating an electrical configuration of the apparatus for detecting a decrease in a tire air pressure shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of this CPU 2b; and a RAM 2d to which data is temporarily written when the CPU 2b performs a control operation or from which the written data is read out.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, angular velocities Fi of the respective tires at every predetermined sampling cycle $\Delta T$(sec) (e.g., $\Delta T$=0.05 second).

By the way, tires are manufactured to include variation within a standard (initial difference). Thus, the effective rolling radii of the respective tires (values obtained by dividing a travel distance for one rotation by $2\pi$) are not always equal even when all of the tires have a regular internal pressure. This causes variation in the angular velocity Fi of the respective tires. Therefore, there is a method to exclude an influence by the initial difference from the angular velocity Fi for example. This method firstly calculates the following initial correction coefficients K1, K2, and K3.

$$K1=F1/F2 \quad (1)$$

$$K2=F3/F4 \quad (2)$$

$$K3=(F1+K1 \times F2)/(F2+K2 \times F4) \quad (3)$$

Next, these calculated initial correction coefficients K1, K2, and K3 are used to calculate a new angular velocity $F1_i$ as shown in the formulae (4) to (7).

$$F1_1=F1 \quad (4)$$

$$F1_2=K1 \times F2 \quad (5)$$

$$F1_3=K3 \times F3 \quad (6)$$

$$F1_4=K2 \times K3 \times F4 \quad (7)$$

Here, the initial correction coefficient K1 is a coefficient to correct a difference in the effective rolling radius due to an initial difference between left front and right front tires. The initial correction coefficient K2 is a coefficient to correct a difference in the effective rolling radius due to an initial difference between left rear and right rear tires. The initial correction coefficient K3 is a coefficient to correct a difference in the effective rolling radius due to an initial difference between a left front tire and a left rear tire. Based on the $F1_i$, wheel speeds Vi of the respective wheels are calculated.

In this embodiment, in order to judge a decrease in a pneumatic pressure, the following judgment value DEL2 is used.

Specifically, as a decreased pressure judgment value DEL2 showing a wheel speed ratio between the front and rear axes, a ratio obtained by dividing a difference between the sum of wheel speeds of front wheel tires and the sum of wheel speeds of rear wheel tires (difference between the two sums) by the average wheel speed of the four wheel tires is used as shown in the following formula (8).

$$DEL2=\{(V1+V2)/2-(V3+V4)/2\}/(V\text{mean}) \times 100(\%) \quad (8)$$

In the formula, V1 to V4 represent the wheel speeds of a left front wheel tire, a right front wheel tire, a left rear wheel tire, and a right rear wheel tire, respectively. Vmean represents (V1+V2+V3+V4)/4.

Figure 3:
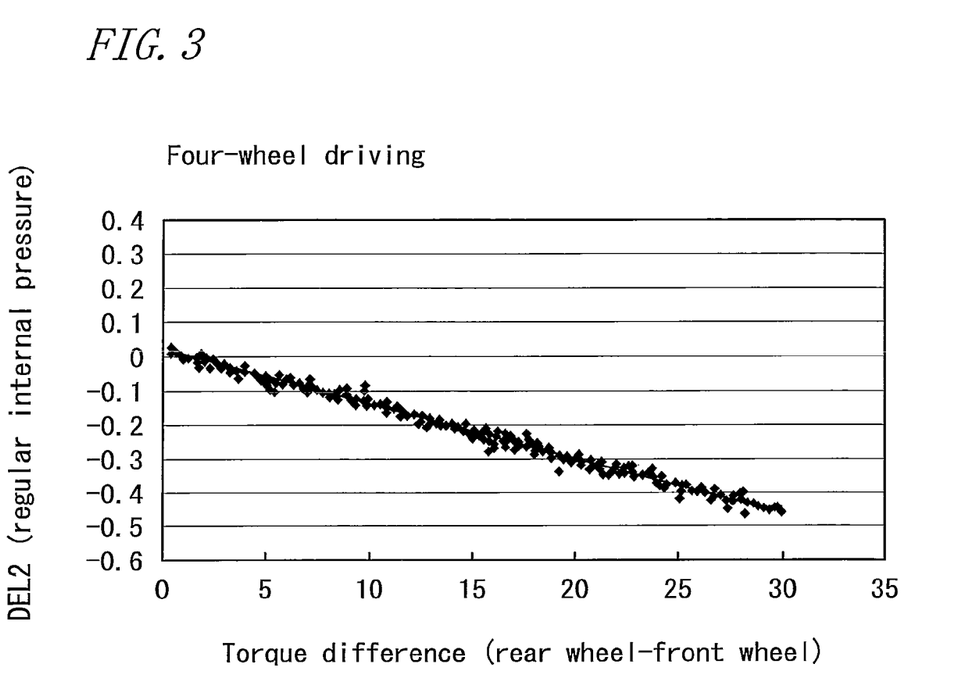
FIG. 3 illustrates a relation between DEL2 and a difference between the front and rear driving torque in a four-wheel driving vehicle for which the distribution of the front and rear driving torque is variable.

In this embodiment, in order to obtain a reference value for judging whether there is a tire having a decreased pressure or not, initialization is performed to store a wheel speed ratio between the front and rear axes at a regular internal pressure. In this initialization, depending on whether the distribution of the front and rear driving torque is equidistribution or not, a different method is used to obtain the front and rear reference values. Specifically, when the distribution of the front and rear driving torque is not equidistribution, DEL2 depends on not the total value of driving torque but on a difference between the front and rear driving torque. Thus, during initialization, DEL2 is represented and stored as a function of a momentarily-changing difference between the front and rear driving torque. In other words, the second relation formula showing a correlation between DEL2 and a difference between the front and rear driving torque is stored. FIG. 3 illustrates DEL2 with a horizontal axis representing a difference between the front and rear driving torque when the distribution of the front and rear driving torque is not equidistribution.

Figure 4:
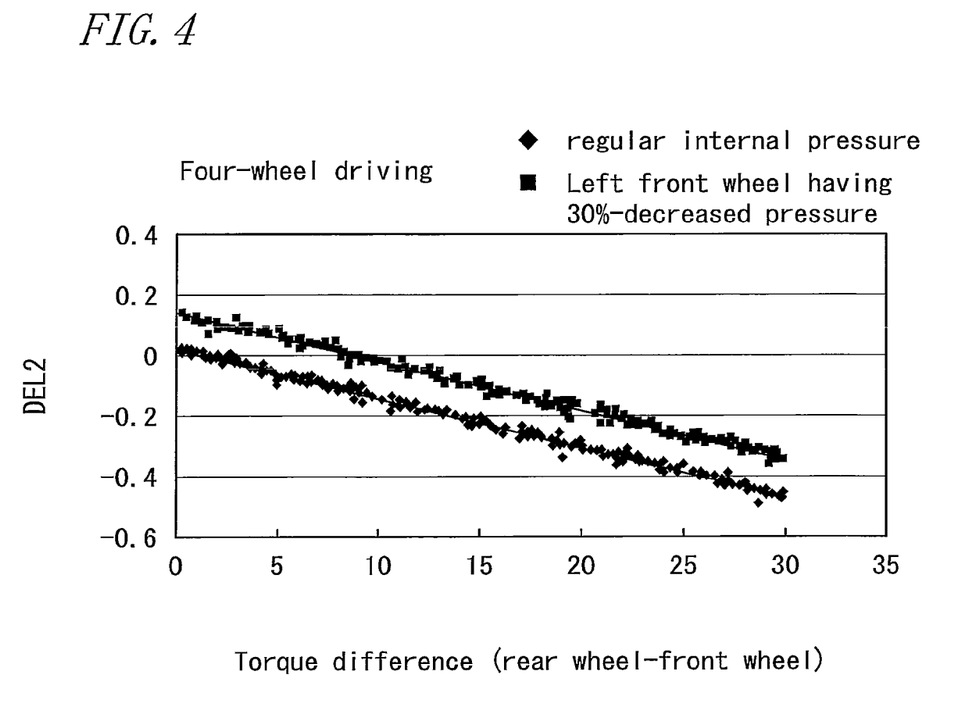
FIG. 4 illustrates a relation between DEL2 and a difference between the front and rear driving torque at a regular internal pressure and a decreased pressure.

Since the difference between the front and rear driving torque and DEL2 can be approximated by a linear function, A and B are calculated that satisfy the relation of DEL2=A×(a difference between the front and rear driving torque)+B as in the case of a two-wheel driving vehicle. Based on this, an index for distinguishing a decreased pressure status from a regular internal pressure status is obtained. FIG. 4 illustrates a relation between DEL2 and a difference between the front and rear driving torque in the regular internal pressure status and a relation between DEL2 and a difference between the front and rear driving torque in the decreased pressure status. For example, DEL2(t) at the regular internal pressure at a certain time t when driving torque T(t)=Trear(t)+Tfront(t) is satisfied is DEL2(t)=A×a difference between the front and rear driving torque{Trear(t)−Tfront(t)}+B. By momentarily monitoring DEL2, an existence or nonexistence of a difference between DEL2 and DEL2(t) at the regular internal pressure can be found. Thus, whether there is a tire having a decreased pressure or not can be judged.

When the distribution of the front and rear driving torque is equidistribution on the other hand (i.e., when Trear(t)−Tfront(t)=0 is satisfied), the first relation formula showing the correlation between the total of the driving torque and DEL2 is calculated. According to this first relation formula, the value of DEL2 is substantially constant regardless of the value of the total of the driving torque as described above. Thus, DEL2=Constant (constant) is satisfied.

As described above, according to the present invention, the distribution of the front and rear driving torque is monitored to determine whether the driving torque has equidistribution or there is a difference between the front and rear driving torque. Then, depending on a case, any of the relation formulae is used to calculate DEL2 at the regular internal pressure. Thus, even in the case of a four-wheel driving vehicle for which the distribution of the front and rear driving torque is variable, a tire having a decreased pressure can be detected accurately.

An apparatus for detecting a decrease in a tire air pressure according to this embodiment is composed of: a wheel speed detection means (wheel rotation information detection means) 1; a judgment means for judging a decrease in a tire air pressure by comparing a decreased pressure judgment value showing a wheel speed ratio between the front and rear axes calculated based on this wheel rotation information with a predetermined reference value; an initialization means for storing a wheel speed ratio between the front and rear axes at the regular internal pressure in order to obtain the predetermined reference value; and a torque distribution determination means for determining whether the distribution of the front and rear driving torque is equidistribution or not. The initialization means includes two computation means. Specifically, one computation means is used to obtain, when the distribution of the front and rear driving torque is determined to be equidistribution, the first relation formula showing a correlation between the total of the driving torque and the decreased pressure judgment value. The other computation means is used to obtain, when the distribution of the front and rear driving torque is determined not to be equidistribution, the second relation formula showing a correlation between a difference in the driving torque and the decreased pressure judgment value. The judgment means is configured to judge a decrease in a tire air pressure by comparing, when the distribution of the front and rear driving torque is determined to be equidistribution, a reference value obtained from the first relation formula with a decreased pressure judgment value and by comparing, when the distribution of the front and rear driving torque is determined not to be equidistribution, the reference value obtained from the second relation formula with the decreased pressure judgment value. A program for determining a decrease in a tire air pressure causes the control unit 2 to function as a judgment means, an initialization means, and a torque distribution determination.

The following section will describe an embodiment of a method of detecting a decrease in a tire air pressure of the present invention. However, the present invention is not limited to such an embodiment.

Embodiment

Tires (225/50 R17) were attached to a four-wheel driving vehicle for which the distribution of the front and rear driving torque was variable and the vehicle was subjected to an actual vehicle test at Okayama test course of Sumitomo Rubber Industries. Ltd.

Initialization was performed with various distributions of the front and rear driving torque at the regular internal pressures (front wheel: 220 kPa, rear wheel: 270 kPa) to obtain the relation of DEL2 to a difference between the front and rear driving torque. The result is shown in FIG. 3. In FIG. 3, the horizontal axis represents a difference between the front and rear driving torque (rear driving torque−front driving torque) and the vertical axis represents DEL2.

As can be seen from FIG. 3, assuming that the front driving torque is Tfront(t) and the rear driving torque is Trear(t) at a certain time t, the relation of $DEL2(t) = -0.016 \times \{Trear(t) - Tfront(t)\} + 0.02$ can be satisfied.

Next, the vehicle was subjected to a running test while the left front wheel (FL) was having a 30%-decreased pressure to obtain the relation of DEL2 to a difference between the front and rear driving torque. The result is shown in FIG. 4. In the Figure, an increment of DEL2 of about 0.12 is shown when compared with DEL2 of the initialization (at the regular internal pressure). By using this "0.12" as a threshold value, the decreased pressure status can be distinguished from the regular internal pressure status.

Comparative Example

In the initialization process, the relation of DEL2 to the total of driving torque was tried to be obtained. However, as shown in FIG. 9, the relation (formula) of DEL2 to the total of driving torque could not be obtained. Thus, it was not possible to use this DEL2 to judge a tire having a decreased pressure.

It is noted that the present invention is not limited to the above-described embodiment. For example, in addition to the DEL2, DEL1 and DEL3 shown below are obtained. Based on the three DELs, a decrease in a tire air pressure also may be detected. In this case, based on judgment conditions for the respective three decreased pressure judgment values, a decrease in the air pressure of the respective wheel tires can be judged to identify a tire having a decreased pressure.

As a judgment value DEL1, ratio values obtained by dividing a difference between the sums (totals) of the wheel speeds of two pairs of wheel tires on diagonal lines by an average wheel speed of the four wheel tires (average value of the two totals) is used as shown in the following formula (9). As a judgment value DEL3, ratio values obtained by dividing a difference between the sum of the wheel speeds of right wheels and the sum of the wheel speeds of left wheels (difference between the sums of the two pairs) by an average wheel speed of the four wheel tires is used as shown in the following formula (10).

$$DEL1 = \{(V1+V4)/2 - (V2+V3)/2\}/(V\text{mean}) \times 100(\%) \quad (9)$$

$$DEL3 = \{(V1+V3)/2 - (V2+V4)/2\}/(V\text{mean}) \times 100(\%) \quad (10)$$

Then, the conditions for judging a decreased pressure in the respective wheels can be set in the following manner for example. In the following condition formulae, FDth and RDth are a front wheel alarming threshold value and a rear wheel alarming threshold value, respectively.

(i) A judgment condition A1 for a decreased air pressure of the left front wheel tire FL is:

DEL1>FDth(>0),
DEL2>FDth(>0), and
DEL3>FDth(>0).

(ii) A judgment condition A2 for a decreased air pressure of the right front wheel tire FR is:

DEL1<−FDth(<0),
DEL2>FDth(>0), and
DEL3<−FDth(<0).

(iii) A judgment condition A3 for a decreased air pressure of the left rear wheel tire RL is:

DEL1<−RDth(<0),
DEL2<−RDth(<0), and
DEL3>RDth(>0).

(iv) A judgment condition A4 for a decreased air pressure of the right rear wheel tire RR is:

DEL1>RDth(>0),
DEL2<−RDth(<0), and
DEL3<−RDth(<0).

In the present invention, formulae showing a judgment value of a decreased pressure of a tire are not limited to the above-described ones. Any formula may be used so long as the formula can represent a difference between a diagonal wheels, a difference between front and rear wheels, and a difference between left and right wheels, including the following formulae (11) to (13) for example.

$$DEL1=\{(V1+V4)/(V2+V3)-1\}\times 100(\%) \quad (11)$$

$$DEL2=\{(V1+V2)/(V3+V4)-1\}\times 100(\%) \quad (12)$$

$$DEL3=\{(V1+V3)/(V2+V4)-1\}\times 100(\%) \quad (13)$$

What is claimed is:

1. A method of detecting a decrease in a tire air pressure based on wheel rotation information obtained from tires by a rotation information detection means attached to a four-wheel vehicle for which a distribution of the front and rear driving torque is variable, comprising:
    a step of calculating wheel rotation information obtained from the respective wheel tires using a computer control unit;
    a judgment step judging a decrease in a tire air pressure by comparing a predetermined reference value with a decreased pressure judgment value that is calculated using a computer control unit based on the wheel rotation information and that shows a wheel speed ratio between the front and rear axes;
    an initialization step of storing a wheel speed ratio between the front and rear axes at a regular internal pressure using a computer control unit in order to obtain the predetermined reference value; and a step of determining whether a distribution of front and rear driving torque using a computer control unit is equidistribution or not,
    wherein the initialization step includes a step of obtaining, when the distribution of the front and rear driving torque is determined to be equidistribution, a first relation formula showing a correlation between the total of the driving torque and the decreased pressure judgment value and a step of calculating, when the distribution of the front and rear driving torque is determined not to be equidistribution, a second relation formula showing the correlation between a difference in the driving torque and the decreased pressure judgment value, and
    wherein the judgment step judges a decrease in a tire air pressure by comparing, when the distribution of the front and rear driving torque is determined to be equidistribution, a reference value obtained based on the first relation formula with the decreased pressure judgment value and by comparing, when the distribution of the front and rear driving torque is determined not to be equidistribution, the reference value obtained based on the second relation formula with the decreased pressure judgment value.

2. The method of detecting a decrease in a tire air pressure according to claim 1, wherein the judgment step includes:
    a step of computing a decreased pressure judgment value obtained by dividing a difference in the sum of wheel rotation information between two pairs of wheel tires on diagonal lines by a predetermined average wheel speed and a decreased pressure judgment value obtained by dividing a difference between a sum of wheel rotation information of right wheel tires and a sum of wheel rotation information of left wheel tires by a predetermined average wheel speed, respectively, using a computer control unit;
    a step of storing these decreased pressure judgment values and the decreased pressure judgment value showing a wheel speed ratio between the front and rear axes using a computer control unit; and
    a step of judging, using a computer control unit, based on judgment conditions for the respective three decreased pressure judgment values set for the respective wheel tires, a decrease in the air pressures of the respective wheel tires.

3. An apparatus for detecting a decrease in a tire air pressure based on wheel rotation information obtained from tires attached to a four-wheel vehicle for which a distribution of the front and rear driving torque is variable, comprising: a rotation information detection means for calculating wheel rotation information obtained from the respective wheel tires;
    a judgment means for judging a decrease in a tire air pressure by comparing a predetermined reference value with a decreased pressure judgment value that is calculated based on the wheel rotation information and that shows a wheel speed ratio between the front and rear axes;
    an initialization means for storing a wheel speed ratio between the front and rear axes at a regular internal pressure in order to obtain the predetermined reference value; and a torque distribution determination means for determining whether a distribution of front and rear driving torque is equidistribution or not,
    wherein the initialization means includes a computation means for obtaining, when the distribution of the front and rear driving torque is determined to be equidistribution, a first relation formula showing a correlation between the total of the driving torque and the decreased pressure judgment value and a computation means for obtaining, when the distribution of the front and rear driving torque is determined not to be equidistribution, a second relation formula showing the correlation between a difference in the driving torque and the decreased pressure judgment value, and
    wherein the judgment means judges a decrease in a tire air pressure by comparing, when the distribution of the front and rear driving torque is determined to be equidistribution, a reference value obtained based on the first relation formula with the decreased pressure judgment value and by comparing, when the distribution of the front and rear driving torque is determined not to be equidistribution, the reference value obtained based on the second relation formula with the decreased pressure judgment value.

4. The apparatus for detecting a decrease in a tire air pressure according to claim 3, wherein the judgment means includes:
    a computation means for computing a decreased pressure judgment value obtained by dividing a difference in the sum of wheel rotation information between two pairs of wheel tires on diagonal lines by a predetermined average wheel speed and a decreased pressure judgment value obtained by dividing a difference between a sum of wheel rotation information of right wheel tires and a sum of wheel rotation information of left wheel tires by a predetermined average wheel speed, respectively;
    a storage means for storing these decreased pressure judgment values and the decreased pressure judgment value showing a wheel speed ratio between the front and rear axes; and
    a means for judging, based on judgment conditions for the respective three decreased pressure judgment values set for the respective wheel tires, a decrease in the pneumatic pressures of the respective wheel tires.

5. A program for causing, in order to detect a decrease in a tire air pressure based on wheel rotation information obtained from tires attached to a four-wheel vehicle for which a distribution of the front and rear driving torque is variable, a computer to function as:

a judgment means for judging a decrease in a tire air pressure by comparing a predetermined reference value with a decreased pressure judgment value that is calculated based on wheel rotation information obtained from the respective wheel tires and that shows a wheel speed ratio between the front and rear axes;

an initialization means for storing a wheel speed ratio between the front and rear axes at a regular internal pressure in order to obtain the predetermined reference value; and a torque distribution determination means for determining whether a distribution of front and rear driving torque is equidistribution or not, wherein the initialization means includes a computation means for obtaining, when the distribution of the front and rear driving torque is determined to be equidistribution, a first relation formula showing a correlation between the total of the driving torque and the decreased pressure judgment value and a computation means for obtaining, when the distribution of the front and rear driving torque is determined not to be equidistribution, a second relation formula showing the correlation between a difference in the driving torque and the decreased pressure judgment value, and wherein the judgment means judges a decrease in a tire air pressure by comparing, when the distribution of the front and rear driving torque is determined to be equidistribution, a reference value obtained based on the first relation formula with the decreased pressure judgment value and by comparing, when the distribution of the front and rear driving torque is determined not to be equidistribution, the reference value obtained based on the second relation formula with the decreased pressure judgment value.

* * * * *